Figure 2:
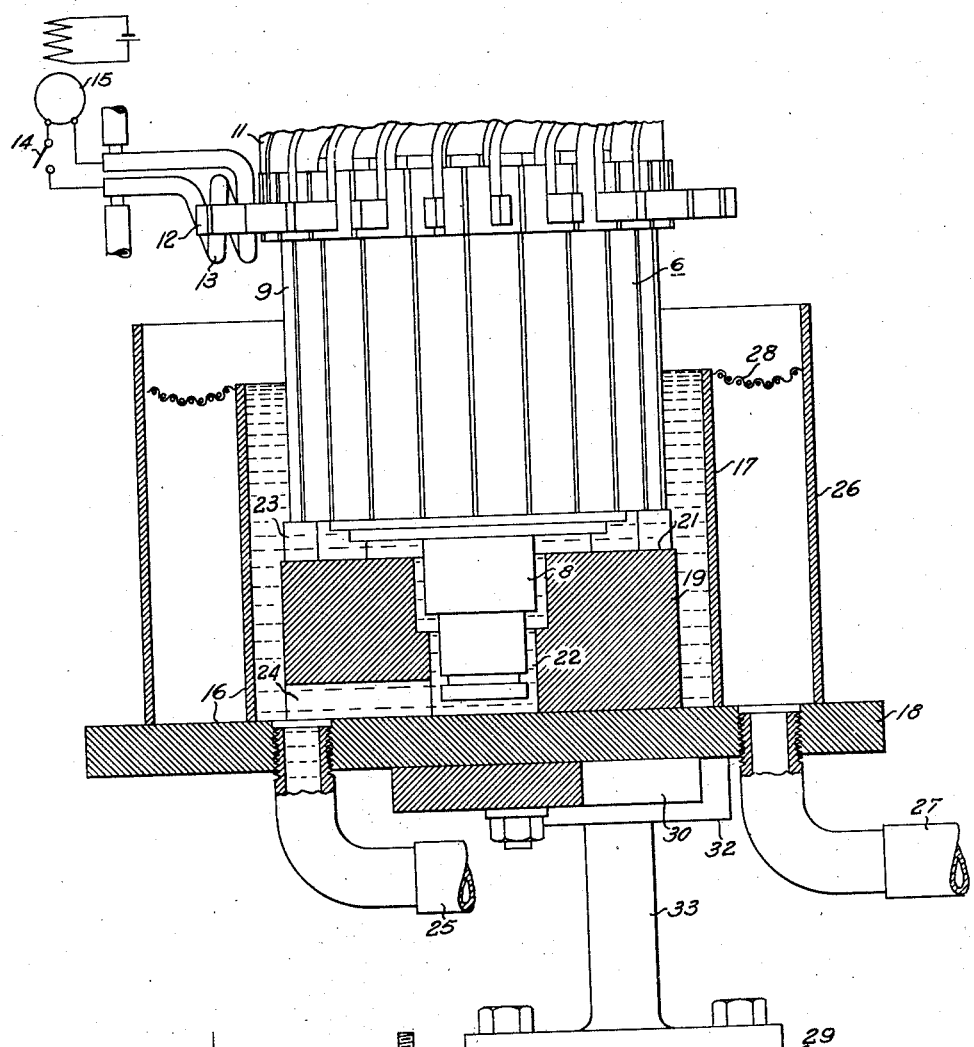

Oct. 11, 1949.

C. F. COBB ET AL 2,484,333

COMMUTATOR BRAZING FIXTURE

Filed Aug. 10, 1945

Inventors
Carroll F. Cobb
Joseph J. DeWindt
Stephen A. Weillauf
by Didier Journeaux
Attorney Patented Oct. 11, 1949

2,484,333

UNITED STATES PATENT OFFICE 2,484,333

COMMUTATOR BRAZING FIXTURE

Carroll F. Cobb and Joseph J. De Windt, Silverton, and Stephen A. Weitlauf, Cincinnati, Ohio, assignors to Allis-Chalmers Manufacturing Company, Milwaukee, Wis., a corporation of Delaware Application August 10, 1945, Serial No. 610,000

2 Claims. (Cl. 219—13)

This invention relates in general to improvements in brazing fixtures and more particularly to means for holding a commutator in the proper position with respect to a source of heat for brazing the commutator leads while maintaining the commutator bars within a temperature range below the temperature which would cause serious deterioration of the commutator insulation.

In the process of brazing armature leads to the bars of a commutator it is important to bring the bar portion being brazed to the desired temperature in the shortest possible length of time while keeping the balance of the bar and the other bars at relatively low temperatures to prevent the commutator insulation from becoming heated at such temperature and for such length of time as to cause serious damage thereto. The heating source and the bar to be brazed should therefore be held securely in the optimum relative position for the supply of heat to the bar for the necessary length of time. This condition is particularly important when heat is supplied to the commutator bars by induction of electric current therein. In addition, the commutator and especially the unheated portion of the bar being brazed should be cooled intensely to reduce the length of time during which the commutator insulation is heated above ambient temperature.

The above requirements are preferably met by utilizing a stationary source of heat and by rotatably mounting the commutator on a support which is in turn suitably pivoted to permit swinging the commutator in and out of heating relation with the source. The support is preferably provided with suitable means for guiding a flow of cooling fluid about a predetermined portion of the commutator and for supplying additional cooling fluid to selected portions of the commutator, including the bar being brazed. The support should be adjustable with respect to the heat source to adapt the device for the brazing of different sizes of commutators without thereby disturbing the supply of cooling fluid.

It is therefore an object of the present invention to provide a commutator brazing fixture insuring accurate application of heat to the bar being brazed.

Another object of the present invention is to provide a commutator brazing fixture providing for the selective cooling of the bar being brazed and of the other parts of the commutator.

Another object of the present invention is to provide a commutator brazing fixture by means of which the point of application of heat to the commutator may be adjusted without disturbing the supply of cooling fluid.

Figure 1:
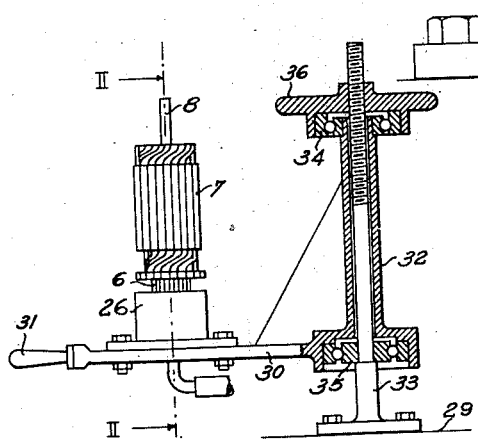

Objects and advantages other than those above set forth will be apparent from the following description when read in connection with the accompanying drawing, in which:

Fig. 1 is a view partly in elevation and partly in vertical cross section of one embodiment of the present invention; and Fig. 2 is an enlarged partial view in cross section taken along line II—II of Fig. 1.

Referring more particularly to the drawing by characters of reference, numeral 6 designates a commutator assembled with the associated core 7 on a common shaft 8. Each bar of the commutator is to be brazed to an upper lead and to the associated lower lead, the ends of which are disposed within a radial slot provided in the neck portion of each commutator bar as is well known. To permit directly supplying heat to the lower lead during the brazing process, each lower lead is preferably bent radially outward in axial alignment with the end of the associated upper lead, and it is of further advantage to extend the bent end of the lower lead above the surrounding commutator surface. Fig. 2 shows the commutator disposed for brazing to a commutator bar 9, an upper lead 11 and a lower lead 12, in the manner disclosed in a copending application of Carroll F. Cobb, Edward F. Brill and John R. Guenther, filed August 6, 1945 under Serial No. 609,186, now Patent 2,455,560, issued Dec. 7, 1948. The brazing operation is preferably effected using as source of heat an inductor 13 which may be connected through a switch 14 to any suitable source of alternating current conventionally represented as a synchronous generator 15.

To enable the operator to bring the different commutator bars sequentially in heating relation with inductor 13, commutator 6 is rotatably mounted on the bottom of a swingably supported cup 16, shaft 8 then extending vertically along the axis of the cup. The cup may be made in any suitable manner, for example by welding a metallic shell 17 to a rigid flat metal plate 18. Commutator 6 rests on plate 18 through the intermediary of a block 19 of any suitable material. Block 19 presents a horizontal top surface 21 having substantially the same diameter as the lower end of commutator 6 and is provided with a bore 22 of slightly greater diameter than the diameter of shaft 8. Block 19 is provided with projections 23 integral therewith or separate therefrom for holding commutator 6 a short distance above surface 21. A radial passage 24 is provided between the bottom of bore 22 and the periphery of block 19. Cooling fluid such as cold water is introduced into cup 16 at the outer end of passage 24 by means including a section of flexible hose 25 connected with a supply of water under pressure (not shown). The water flowing over the edge of cup 16 may conveniently be conducted to a drain by means of a second shell 26 welded to plate 18 and a second section of flexible hose 27. A suitable piece of metal screening 28 may be disposed between shells 17 and 26 to retain pieces of brazing metal and other foreign bodies which might obstruct the drain.

Cup 16 is swingably mounted on a suitable base 29 through adjustable means providing for movement of the cup in a plane perpendicular to shaft 8. More particularly, cup 16 is adjustably bolted or otherwise fastened to a lever 30 provided with a suitable operating handle 31. Lever 30 is welded or otherwise fastened to a sleeve 32 mounted on base 29 through a shaft 33 and a pair of suitable ball bearings 34, 35. Shaft 33 is parallel to the direction desired for the axis of commutator 6 and shaft 8 and is therefore vertical when the shaft is to extend vertically from cup 16. Sleeve 32 may be raised or lowered by means of a handwheel 36 fastened to the outer race of bearing 34 and screwed on a threaded portion of shaft 33.

During the brazing operation the neck portion of bar 9 is heated to a temperature above the melting point of the brazing material, and it is generally impractical to avoid also heating the necks of the adjacent commutator bars to a slight extent. Heat thus supplied successively to the different bars being brazed is conducted through the bars and should be continuously removed during the brazing operation of the bar and for a substantial length of time after the completion thereof to prevent overheating of the insulation. For this purpose cooling water is admitted to cup 16 through hose 25 and flows through passage 24 and the passage defined by the end and peripheral surfaces of commutator 6 and shaft 8 on the one hand and the inner surfaces of block 19 and shell 17 on the other hand. At the same time, an additional flow of cooling water is directed from hose 25 along the adjacent surfaces of block 19 and shell 17 located below bar 9 and is thereby directed along the peripheral portions of bar 9 and of the adjacent bars to intensify the cooling of such bars.

When the brazing of bar 9 is completed, the bar is moved out of heating relation with inductor 13 by causing lever 30 to swing about shaft 33. Commutator 6 may then be rotated within cup 16 to the necessary extent to bring another bar to be brazed into the position previously assumed by bar 9. Lever 30 is then returned to the position shown to bring the selected bar into the proper heating relation with inductor 13. The operation is repeated for each bar of commutator 6 until all the leads have been brazed to the associated bars.

It will be apparent that any number of duplicate commutators may be brazed in succession in the device without requiring any new adjustment of the means supporting cup 16. When a commutator to be brazed has bars of a length different from the length for which the device is adjusted, lever 30 is raised or lowered by turning wheel 36 to the necessary extent to bring the commutator bar to the proper height with respect to inductor 13. The adjustment of lever 30 does not disturb the supply of cooling water to cup 16 and the cooling of the commutator therefore requires no attention from the operator beyond seeing that the sufficient flow of water takes place through the cup.

Although but one embodiment of the present invention has been illustrated and described, it will be apparent to one skilled in the art that various changes and modifications may be made therein without departing from the spirit of the invention or from the scope of the appended claims.

It is claimed and desired to secure by Letters Patent:

1. A device for brazing protruding armature leads to the bars of a commutator mounted on a shaft by means of an inductor which is fixed with respect to a base, said bars being in heat conductive relation to one another and said shaft, said device comprising a cup, means for rotatably supporting said commutator on the bottom of said cup comprising a block having a top area and a bore having a diameter greater than the diameter of said shaft and means for holding the end surface of said commutator above said area with said shaft loosely confined within said bore to define an annular passage, said commutator rotatably mounted for successively moving the different said leads into a position adjacent said inductor with the bars of said commutator partly extending above said cup, means for swingably mounting said cup on said base for movement bringing a selected one of said leads from said position into heating engagement with said inductor and back into said position, a source of cooling fluid, and a pipe connected with said source and directing a substantial portion of the cooling fluid from said source between said cup and said block and along the peripheral surface of one of said bars selected by rotation of said commutator and engaged by said selected one of said leads to remove heat directly supplied thereto by said inductor, said cup cooperating with said commutator to define a passage continuing said annular passage for distributing another portion of said cooling fluid along the end and part of the peripheral surface of said commutator to remove heat transmitted by conduction from said one of said bars to the remainder of said bars.

2. A device for brazing protruding armature leads to the bars of a commutator by means of an inductor which is fixed with respect to a base, said device comprising a vertical pivot mounted on said base a predetermined distance from said inductor, a cup, a support for swingably mounting said cup upon said pivot at said predetermined distance from said pivot, a block for rotatably supporting said commutator on the bottom of said cup for successively moving the different said leads into a position adjacent said inductor at said predetermined distance from said pivot with the bars of said commutator partly extending above said cup, swinging movement of said support bringing a selected one of said leads from said position into heating engagement with said inductor and back into said position, a source of cooling fluid connected with said cup, said block directing a substantial first portion of said cooling fluid from said source along the surface of one of said bars selected by rotation of said commutator and engaged by said selected one of said leads to remove heat supplied to said bar by said inductor, said block distributing a second portion of said cooling fluid from said source along the surfaces of the shaft and of said bars conductively heated from said selected one of said bars.

CARROLL F. COBB.
JOSEPH J. DE WINDT.
STEPHEN A. WEITLAUF.

REFERENCES CITED

The following references are of record in the file of this patent:

UNITED STATES PATENTS

| Number | Name | Date |
|---|---|---|
| 635,091 | Dyer | Oct. 17, 1899 |
| 896,951 | Stone | Aug. 25, 1908 |
| 1,123,080 | Bowser | Dec. 29, 1914 |
| 1,238,257 | Butler | Aug. 28, 1917 |
| 2,034,418 | Plant | Mar. 17, 1936 |
| 2,043,773 | Rich | June 9, 1936 |
| 2,328,694 | Townsley | Sept. 7, 1943 |